United States Patent Office 3,271,223
Patented Sept. 6, 1966

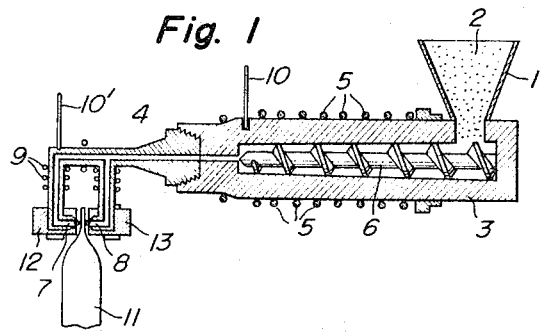
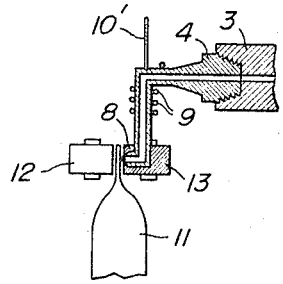
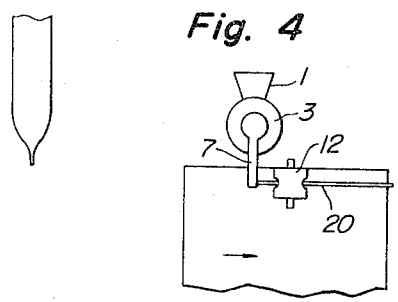
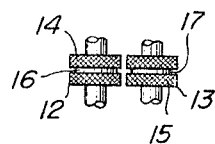
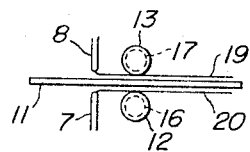
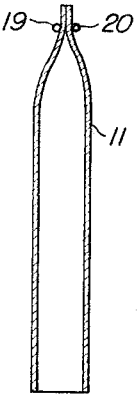
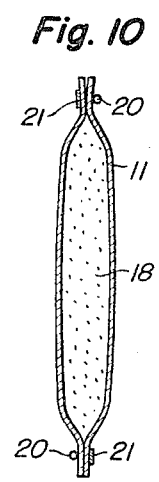
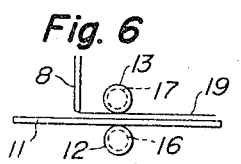
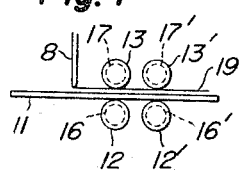

3,271,223
METHODS FOR SEALING THERMOPLASTIC RESIN FILM
Michio Sudo, Tokyo, Japan, assignor to Asaki Dow Limited, Tokyo, Japan, a corporation of Japan
Filed June 20, 1963, Ser. No. 289,227
Claims priority, application Japan, Oct. 30, 1962, 37/47,086; Dec. 20, 1962, 37/76,109
5 Claims. (Cl. 156—244)

This invention relates to methods for sealing open sacks of thermoplastic resin film. More particularly this invention relates to methods for sealing sacks of thermoplastic resin film by adhering fused resin tape to the film.

Since thermoplastic resin film is resistant to moisture, water, and chemicals, sacks of such resin film have been replacing heavy-duty multi walled paper sacks used for packing fertilizer and chemicals. The sealing of such sacks of thermoplastic resin film have been dependent upon heat-sealing or high frequency welding. However these methods have had drawbacks in that the film in the sealed portion becomes thinner than that of the rest of the sack and as a consequence of this, the juncture between the sealed portion and the rest of the sack is frequently broken during transportation of the sacks causing leakage of the contents.

An object of this invention is to provide methods for sealing sacks of thermoplastic resin which do not have the drawback as mentioned above and do not cause lowering of strength at said juncture.

In the method of this invention the materials to be sealed are in face-to-face relation and fused thermoplastic resin tape is injected from the nozzle of extruder and is adhered to one or both materials to be sealed along the end of the sacks and passed through pressing rolls by which complete sealing is effected. Namely by employing the remaining heat of the molten resin adhered to the side walls of the sack, the resin film of the sacks is brought into fusible state and by the pressure of the rolls, complete adhesion of the sealing resin and resin film of the sacks is effected. By this method satisfactory sealing can be effected in which the sealed part does not become thinner at the juncture while the sealing strength is very high.

The invention will next be described in greater detail in the following examples with reference to the accompanying drawing, in which:

FIG. 1 is a schematic illustration partly in section of sealing extrusion apparatus according to the invention;

FIG. 2 shows a modification in the apparatus of FIG. 1;

FIG. 3 is a side view showing in detail pressing rolls having grooves;

FIG. 4 is a side view of the apparatus of FIG. 1;

FIGS. 5 to 7 are top views showing the sealing of material according to several modified versions; and FIGS. 8 to 10 are sectional views of tubes showing sealed ends according to the method of this invention.

Example 1

As shown in FIG. 1, polyethylene is charged in a hopper 1 of an extruder, and fused by main heater coils 5 set on the barrel 3 of the extruder. The fused polyethylene is extruded toward a die 4 by a screw 6. Die 4 has two nozzles 7 and 8 having outlets which are opposed to each other, with a gap between said nozzles sufficient for the passage of the material to be joined in sealed relation. Supplementary heater coils 9 are wound on the two-branched barrels or conduits in die 4. The temperature of the nozzle is regulated so that the thermometer 10' in the die indicates the same reading as thermometer 10 on the barrel 3. When the temperature of the nozzles and the barrel is from 160° C. to 200° C., polyethylene is extruded in the form of a bead from the nozzles 7 and 8. By passing the open end of the polyethylene sack between the nozzles for the purpose of sealing, fused polyethylene 19 and 20 (FIG. 5) is adhered with the side walls along their ends. A set of pressing rolls 12 and 13 effect pressing and sealing of the polyethylene and the side walls of the sack.

It is preferable to select the diameter of the nozzles according to the following table.

| Thickness of the film | Diameter of the nozzle |
| --- | --- |
| From 0.02 mm. to 0.05 mm. | about 1 mm. |
| From 0.05 mm. to 0.1 mm. | about 2 mm. |
| From 0.1 mm. to 0.25 mm. | about 3 mm. |
| | ~5 mm. |

NOTE: Extruder screw diameter 40 m./m. r.p.m.=about 50.

Example 2

For the sealing of a sack of 0.2 mm. polyethylene film, polypropylene (having a melting point which is higher than that of polyethylene) is employed as a sealing resin in order to supply sufficient heat to insure fusion of the film. By employing a nozzle having a diameter from 3 to 4 mm. and by making the barrel temperature about 160° C. to 180° C., and the nozzle temperature about 190° to 200° C., fused resin is extruded from the nozzles to adhere with the outer wall of the sack which is passing at a speed of about 20 cm. per second. The sealed portion further passes several sets of knurled pressing rolls (12, 13 and 12', 13') which have half-circular knurled grooves 16 and 17 and have water cooling or air cooling means to keep the temperature at 70° C. to 80° C. Sealing is thus completed.

Example 3

In order to seal a sack of 0.2 mm. polyethylene film, polypropylene is employed as in Example 2. By employing a nozzle having a diameter of 3 to 4 mm. and by making the barrel temperature about 220° C. to 230° C., and the nozzle temperature about 230° C. to 250° C. fused resin is extruded to adhere onto one side of the outer wall of the sack (FIG. 2 and FIG. 6) which is passing at a speed of about 25 cm. to 35 cm. per sec. and sealing is performed by pressing as in Example 2.

Example 4

For sealing a sack of 0.3 mm. nylon 6—6 film (two ply film of 0.15 mm.) nylon 6—6 is employed as a sealing resin. By use of a 45 mm., diameter extruder and a 4 mm. diameter nozzle, and by making the temperature 280° C. at the extruder barrel and 280° C. to 290° C. at the nozzle, fused resin is extruded from the nozzle at the speed of about 15 cm. per sec. and sealing is performed by pressing as in Example 2.

Example 5

For sealing sacks of 0.25 mm. polyethylene film (melt index 1 and 0.3), polyethylene (melt index 1 and 0.7) is employed as a sealing resin. By use of a 45 mm. diameter extruder and a flat rectangular nozzle having a 20 mm. width and a 1~1.5 mm. opening and by making the temperature 170° C. at the extruder barrel and 160° C. at the nozzle, a tape of fused resin is extruded from the nozzle at a speed of about 20 cm. per sec. and sealing is performed by pressing as in Example 2.

Example 6

For sealing a sack of 0.06 mm. polypropylene film polypropylene is employed as a sealing resin. By use of a 45 mm. diameter extruder and a 3 mm. diameter nozzle and by making the temperature 230° C. at the extruder barrel and 250° C. at the nozzle, a bead of fused resin is extruded from the nozzle at a speed of about 90 cm. per sec. and sealing is performed by pressing as in Example 2.

When an injecting resin having a melting point higher than that of the film of the sacks is employed, one side injection such as that in FIG. 6 is sufficient due to complete fusion of the both sides of the film by the high temperature of the injecting resin.

It is important to have knurls 14 and 15 extend completely around the pressing rolls. Grooves 16 and 17 of the rolls are also necessary on the part which touches fused resin. By the pressure of these rolls exerted on the fused part, it is possible to avoid the injection from being crushed and to prevent the temperature necessary to fuse the sack resin from lowering and accordingly to increase the sealing strength due to efficient fusion. Knurling all over the pressing roll surface increases the effective pressing area and prevents the film from slipping. Two sets of rolls can be used as shown in FIG. 7. Either cooling water passing through the pressing rolls or cooling air from a blower can keep the temperature of the pressing roll at a definite value. This is helpful in preventing the injecting resin from sticking to the pressing rolls and is especially effective when resins with high melting points are used.

It is also possible to use one nozzle at one side which is different from the nozzle at the other side, by which as shown in FIG. 10, is is possible to inject resin in circular form 20 at one side and in broader strip form 21 at the other side.

As the injecting resin, polyethylene, polyvinylidene chloride, its copolymer, polyvinyl chloride, copolymer of vinyl-chloride and acetate, polymethyl methacrylate, polyisobutylene, polypropylene, polyamide, acetyl cellulose, nitrocellulose, ethyl cellulose and the like can be used. However it is important to select suitable temperatures and suitable amounts of the injecting resin and speed of the sealing film according to the thickness of the film. Furthermore in the method of this invention it is not only possible to seal the ends of a tube to form the sacks but it is also possible to fold a wide sheet double, lay one thickness on the other, seal two sides together along their ends to make tubes, charge the contents into the tubes and seal the ends to close the container.

What is claimed is:
1. A method for sealing two sheets of thermoplastic material, comprising advancing the two sheets in face-to-face relation, extruding a heated thermoplastic resin in the form of a bead onto the outer surface of at least one of the sheets such that the heated bead advances with the sheets and applying pressure to the sheets immediately adjacent the heated bead to advance the sheets while confining the heated bead to restrict its bounds and cause welding of the sheets together along their mating surfaces by the transfer of heat from the bead.

2. A method according to claim 1, wherein the thermoplastic resin has a melting point higher than that of the sheets.

3. Apparatus for sealing two layers of advancing thermoplastic material together comprising at least one extrusion nozzle adjacent the layers of advancing thermoplastic material, means for supplying heated thermoplastic resin to said nozzle to cause discharge of heated resin in the form of a bead onto the outer surface of one of the layers of material and advancement of the heated bead with the layers and a pair of driven spaced rolls for frictionally engaging and advancing the layers, said rolls being located downstream of the nozzles for the passage of the layers of thermoplastic material therebetween, each roll having a circumferential groove therein for the confined passage of an associated bead, said rolls including portions for frictionally engaging the layers of material along their outer surfaces to advance the layers while the heated resin bead is restricted to its respective groove and the heat of the bead is applied to the layers to cause the same to be welded along their mating surfaces.

4. Apparatus as claimed in claim 3, wherein said portion of said rolls for frictionally engaging the sheets are knurled.

5. Apparatus as claimed in claim 3, wherein said nozzle extends perpendicular to said layers of material at a location immediately upstream of said rolls at the level of the grooves therein and immediately adjacent the outer surface of one of the layers of material.

References Cited by the Examiner
UNITED STATES PATENTS

| | | | |
|---|---|---|---|
| 2,373,744 | 4/1945 | Coghill | 156— 306 X |
| 2,578,664 | 12/1951 | Beery et al. | |
| 2,679,469 | 5/1954 | Bedford | 156—306 X |
| 2,914,108 | 11/1959 | Coakley | 156—466 |
| 3,008,862 | 11/1961 | Haine et al. | 156—244 |

EARL M. BERGERT, *Primary Examiner.*

C. B. COSBY, *Assistant Examiner.*